(12) United States Patent
Harrington

(10) Patent No.: US 10,716,416 B1
(45) Date of Patent: Jul. 21, 2020

(54) FRAME HANGING LEVEL

(71) Applicant: Philip Harrington, Montgomery, TX (US)

(72) Inventor: Philip Harrington, Montgomery, TX (US)

( * ) Notice: Subject to any disclaimer, the term of this patent is extended or adjusted under 35 U.S.C. 154(b) by 215 days.

(21) Appl. No.: 16/118,938

(22) Filed: Aug. 31, 2018

(51) Int. Cl.
*A47G 1/16* (2006.01)
*A47G 1/20* (2006.01)
*G01C 9/24* (2006.01)

(52) U.S. Cl.
CPC ............ *A47G 1/205* (2013.01); *G01C 9/24* (2013.01)

(58) Field of Classification Search
CPC .................................................. A47G 1/205
USPC ................. 33/354, 381, 486, 487, 613, 645
See application file for complete search history.

(56) References Cited

U.S. PATENT DOCUMENTS

| | | | | |
|---|---|---|---|---|
| 833,168 A * | 10/1906 | Keller | ...................... | B25H 7/04 33/666 |
| 4,648,185 A * | 3/1987 | Brandimarte | .......... | A47G 1/205 33/367 |
| 5,069,411 A | 12/1991 | Murphy | | |
| 6,029,362 A * | 2/2000 | Miodragovic | ........... | B25H 7/00 33/483 |
| D442,095 S | 3/2001 | Goss et al. | | |
| 6,199,288 B1 | 3/2001 | Gregory | | |
| 6,421,928 B1 * | 7/2002 | Miller | ................... | A47G 1/205 33/520 |
| 6,473,983 B1 * | 11/2002 | Gier | ........................ | A47G 1/205 33/613 |
| 6,578,812 B2 | 6/2003 | LEmire | | |
| 6,785,977 B1 * | 9/2004 | Crichton | ................ | A47G 1/205 33/613 |
| 7,802,769 B1 | 9/2010 | Lindsey | | |
| 8,061,054 B2 | 11/2011 | Rabin | | |
| 8,347,518 B1 * | 1/2013 | Martinez | ................. | A47G 1/205 33/613 |
| 8,739,423 B1 | 6/2014 | Cortum et al. | | |
| 9,526,359 B2 | 12/2016 | Wawrzyniak | | |
| 9,731,545 B2 * | 8/2017 | Flippo | ........................ | B43L 7/10 |
| D803,076 S * | 11/2017 | Ulloa | ...................... | A47G 1/205 D10/69 |
| D819,465 S * | 6/2018 | Arbuckle | ............... | A47G 1/205 D10/65 |
| 10,165,875 B2 * | 1/2019 | Ulloa | ........................ | A47G 1/24 |
| 10,328,557 B2 * | 6/2019 | Arbuckle | ............... | A47G 1/205 |
| 2002/0078583 A1 * | 6/2002 | Richardson | ............ | A47G 1/205 33/613 |
| 2008/0203266 A1 * | 8/2008 | Gallien | ................... | A47G 1/168 248/495 |
| 2014/0173923 A1 * | 6/2014 | Van Bortel | ............. | A47G 1/22 33/379 |
| 2016/0128497 A1 * | 5/2016 | Marks | ..................... | A47G 1/205 33/666 |
| 2017/0027341 A1 * | 2/2017 | Frazier, Jr. | ............. | A47G 1/205 |

* cited by examiner

*Primary Examiner* — George B Bennett
(74) *Attorney, Agent, or Firm* — Cramer Patent & Design, PLLC; Aaron R. Cramer

(57) ABSTRACT

A frame hanging level having a least one (1) horizontal and one (1) vertical spirit level incorporates positioning assemblies to aid in the marking of a vertical surface in the mounting of a wall decoration. The positionable assemblies depend within an open space and are capable of being manipulated to and secured in a desired position relative to the level.

20 Claims, 3 Drawing Sheets

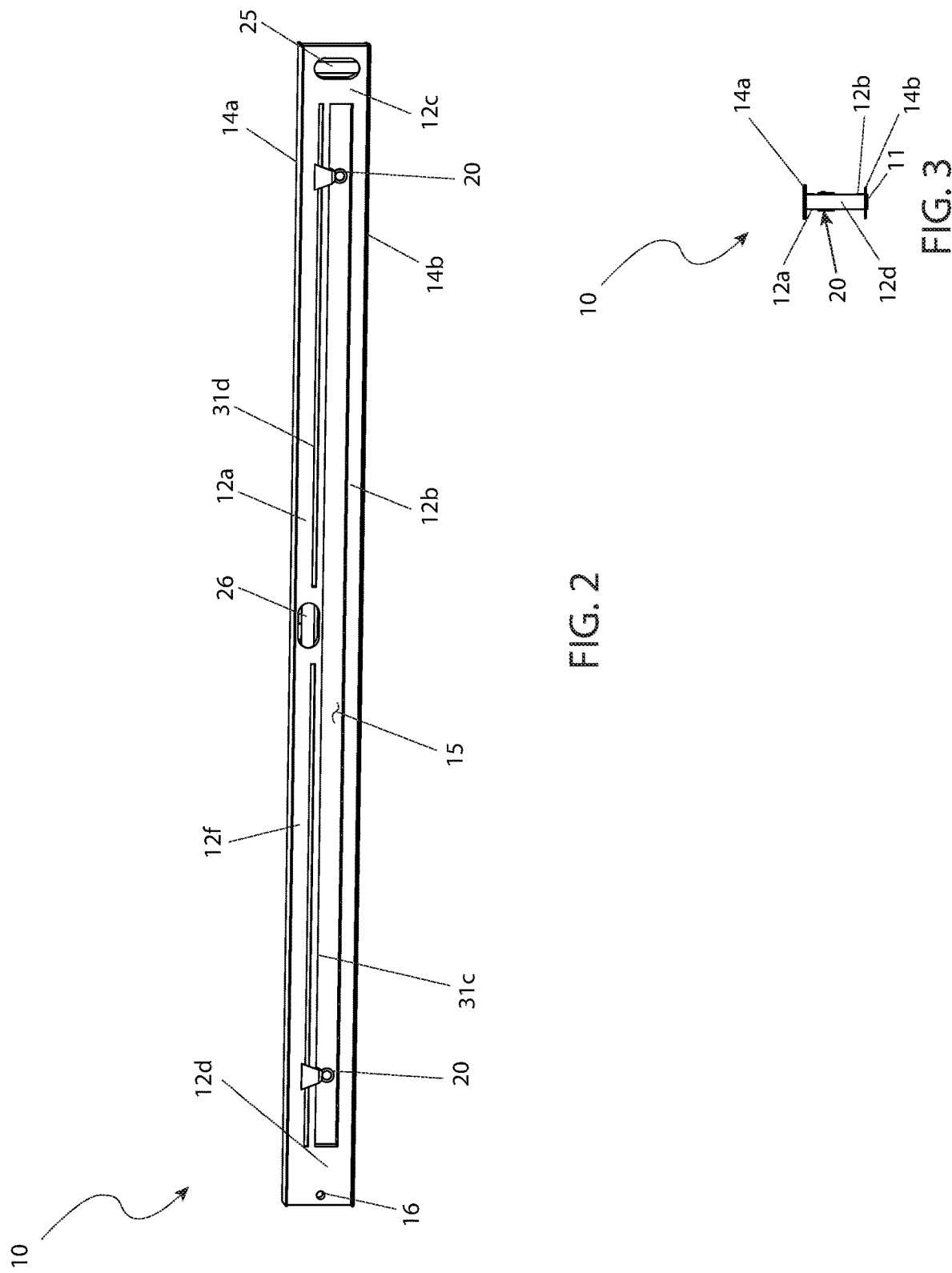

FRAME HANGING LEVEL

RELATED APPLICATIONS

Non-applicable.

FIELD OF THE INVENTION

The present invention relates generally to the field of frame hanging levels.

BACKGROUND OF THE INVENTION

The hanging of a framed picture, artwork, or similar wall hanging is a common home project. Although relatively simple, such takes require a bit of time to perform. Much of this time is occupied by repeated measurement, mathematical calculations, checking and cross checking so that the object ends up hanging where one wants it to and in a level fashion.

Tools such as tape measures, carpenter's levels, marking instruments, and even calculators end up as part of the process. It is also often necessary to require the assistance of other to hold one end of a tape measure or balance the level while marks are made. Even so, it is also a common experience to end up with an extra hole in the wall as errors are a common result as well. Accordingly, there exists a need for a means by which framed pictures and other similar object can be easily hung on the wall without the present disadvantages as described above. The development of the Frame Hanging Level fulfills this need.

SUMMARY OF THE INVENTION

In view of the foregoing disadvantages inherent in the prior art, it has been observed that there is need for a frame hanging level.

To achieve the above and other objectives, the present invention provides for a picture hanging tool comprising a level having an upper portion, a lower portion, a first end portion, a second end portion opposite the first end portion, a first face and a second face. The tool also comprises a first groove which is aligned within the first face and is adjacent the first end and the upper portion, a second groove which is aligned within the first face and is adjacent the second end and the upper portion, a third groove which is aligned parallel to the first groove and within the second face and is adjacent the first end and the upper portion and a fourth groove which is aligned parallel with the second groove and within the second face and is adjacent the second end and the upper portion. Additionally, the tool also comprises an open space which is within the interior perimeter of the upper portion, lower portion, first end portion and second end portion and subjacent the first groove, the second groove, the third groove and the fourth groove, a first spirit level which is disposed within the interior perimeter of the upper portion, lower portion, first end portion and second end portion, a second spirit level which is disposed within the interior perimeter of the upper portion, lower portion, first end portion and second end portion, a first positioning assembly which is secured about the first groove and the third groove and a second positioning assembly which is secured about the second groove and the fourth groove. The first positioning assembly slidingly engages the first groove and the third groove while the second positioning assembly slidingly engages the second groove and the fourth groove. A separate embodiment of the tool may also comprise a mounting aperture.

The first positioning assembly and the second positioning assembly may each comprise a first arm which is configured to slidingly engage the first groove or the second groove, a second arm positioned opposite the first arm and configured to slidingly engage the third groove or the fourth groove by means of a protrusion resting within the third groove or the fourth groove and an eyelet which is subjacent to the first arm and the second arm and projects into the open space. The first positioning assembly and the second positioning assembly may also comprise a fastening aperture which is disposed within the first arm and a fastener.

The fastener may comprise a threaded screw which when rotated in a first direction secures the first positioning assembly or the second positioning assembly in place while when rotated in a second direction the first positioning assembly or the second positioning assembly is free to slidingly engage the first groove and third groove or the second groove or the fourth groove.

The first spirit level may be vertically positioned adjacent the first end portion, subjacent the upper portion and superjacent the lower portion while the second spirit level is horizontally positioned between the first groove and the second groove on the first face and positioned between the third grove and the fourth groove on the second face. The tool may also have a header which is perpendicular to and coextensive with the upper portion and a footer which is perpendicular to and coextensive with the lower portion. The footer may further comprise a magnet disposed upon an outer face of the footer while the first face may comprise a plurality of measurement indicia.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

FIG. 2 is a rear bottom perspective view of the picture hanging tool 10, according to the preferred embodiment of the present invention;

FIG. 3 is a side elevation view of the picture hanging tool 10, according to the preferred embodiment of the present invention;

DESCRIPTIVE KEY

Figure 1:
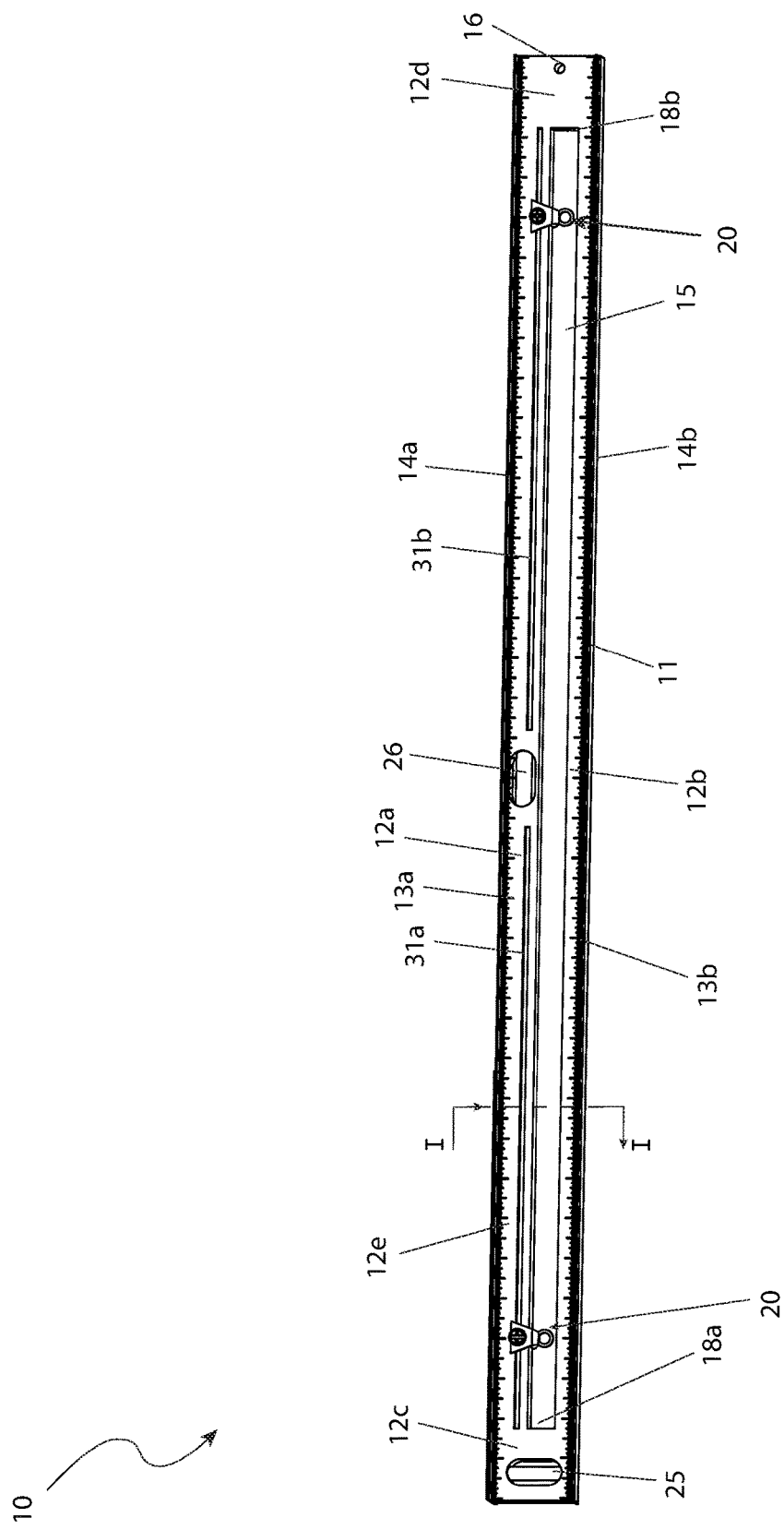
FIG. 1 is a front bottom perspective view of the picture hanging tool 10, according to the preferred embodiment of the present invention.

10 picture hanging tool
11 magnetic feature
12a upper portion
12b lower portion
12c first end portion
12d second end portion
12e first face
12f second face 13a first measurement indicia
13b second measurement indicia
14a header
14b footer
15 open space
16 mounting aperture
18a first inner edge
18b second inner edge
20 positioning assembly
21 eyelet
22a first arm
22b second arm
25 first spirit level
26 second spirit level
30 protrusion
31a first groove
31b second groove
31c third groove
31d fourth groove
32a aperture
32b fastener

DETAILED DESCRIPTION OF THE PREFERRED EMBODIMENT

The best mode for carrying out the invention is presented in terms of its preferred embodiment, herein depicted within FIGS. 1 through 4b. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope.

The terms "a" and "an" herein do not denote a limitation of quantity, but rather denote the presence of at least one (1) of the referenced items.

The present invention describes a picture hanging tool 10 for enabling an individual user to mark a vertical surface prior to hanging a device thereon. In terms of the present disclosure, the use of the tool 10 can aid a user in marking the said vertical surface in order to position the desired device to be hung with regards to a horizontal level, and a vertical level, as so desired.

Depicted in FIGS. 1-3, the tool 10 is generally sized and shaped as an "I"-shaped level, having at least one (1) positioning assembly 20 movably positionable about the tool 10 to a desired location. In a preferred embodiment, the tool 10 is generally described as having an upper portion 12a with a header 14a at an upper edge thereof, and a lower portion 12b with a footer 14b at a lower edge thereof. The first distal ends of the upper portion 12a and lower portion 12b are conjoined to form a first end portion 12c and the second distal ends of the upper portion 12a and lower portion 12b are conjoined to form a second end portion 12d. An open space 15 is defined as existing between a majority of the upper portion 12a and lower portion 12b. Each positioning assembly 20 is movably attached to a lower area of the upper portion 12a to depend within the open space 15. Each positioning assembly 20 travels in a horizontal direction relative to the upper portion 12a and is limited by the ends of the open space 15 (i.e., the distal ends of the upper portion 12a and lower portion 12b).

The tool 10 can generally be delineated into an upper portion 12a and a lower portion 12b, separated by the open space 15 having a first face 12e and a second face 12f. The upper portion 12a has a greater area than the lower portion 12b. A first distal end of both the upper portion 12a and lower portion 12b are integral with and transition into each other to define a first end portion 12c. Similarly, the opposing second distal ends of both the upper portion 12a and lower portion 12b are integral with and transition into each other as well to define a second end portion 12d. The first and second end portions 12c, 12d can be the same size and shape, or one (1) can be larger in area than the other. In a preferred embodiment, they are of the same area. Located at the first end portion 12c, generally adjacent to the edge thereof, is a first spirit level 25, preferably centrally located with respect to a vertical distance between the header 14a and footer 14b. The first spirit level 25 is capable of providing a visual indication of a vertical leveling of the tool 10. Located at the second end portion 12d, generally adjacent to the edge thereof, is a mounting aperture 16, preferably centrally located with respect to a vertical distance between the header 14a and footer 14b. The mounting aperture 16 is capable of receiving a hanging feature to support and store the tool 10.

In a preferred embodiment, the upper portion 12a can be defined as being vertically bisected, so that a pair of positioning assemblies 20 are located on either side of a bisecting center line. Located at the midpoint of such a bisecting center line is a second spirit level 26, similar in size, shape, and material as the first spirit level 25 and capable of visually indicating a horizontal levelness of the tool 10. Disposed on a front face of the upper portion 12a, and preferably coextensive with a length thereof, is first measurement indicia 13a. Similarly, disposed on the same front face of the lower portion 12b, and preferably coextensive with a length thereof, is second measurement indicia 13b. The first and second measurement indicia 13a, 13b can be identical English or metric tick marks with numbers, or the first measurement indicia 13a and second measurement indicia 13b can be one (1) or the other. Additionally, the first measurement indicia 13a can be read left to right and the second measurement indicia 13b can be read right to left, or vice versa.

The tool 10 has a generally "I"-shaped cross-section, having a planar header 14a and a planar footer 14b. The header 14a and footer 14b preferably comprise an identical width and thickness, and each are coextensive with a length of the upper portion 12a and lower portion 12b, respectively. Each positioning assembly 20 has a thickness less than the width of the header 14a or footer 14b, so as to enable the tool 10 to be positioned flush against a vertical surface when in use and manipulating each positioning assembly 20. Affixed to or otherwise integral with the flat lower surface is a magnetic feature 11. The magnetic feature 11 may be coextensive with the footer 14b or any portion thereof. The magnetic feature 11 is capable of providing a magnetic connection to ferromagnetic material, such as nails, staples, brads, screws, and the like.

Referring now to FIG. 1 it is depicted that a preferred embodiment of the tool 10 incorporates two (2) positioning assemblies 20, each separated by a vertical bisecting center line. Each positioning assembly 20 travels within either a first groove 31a which is located on the first face 12e of the upper portion 12a and immediately superjacent the open space 15, and within a third groove 31c, which is on the opposing second face 12f of the upper portion 12a and vertically aligned therewith or travels within a second groove 31b which is located on the first face 12e of the upper portion 12a opposite the first groove 31a and a fourth groove 31d, which is on the opposing second face 12f of the upper portion 12a opposite the third groove 31c. Each positioning assembly 20 is capable of horizontal movement through the first and third grooves 31a, 31c and the second and fourth grooves 31b, 31d to a desired position and then secured at that desired position.

Figure 4B:
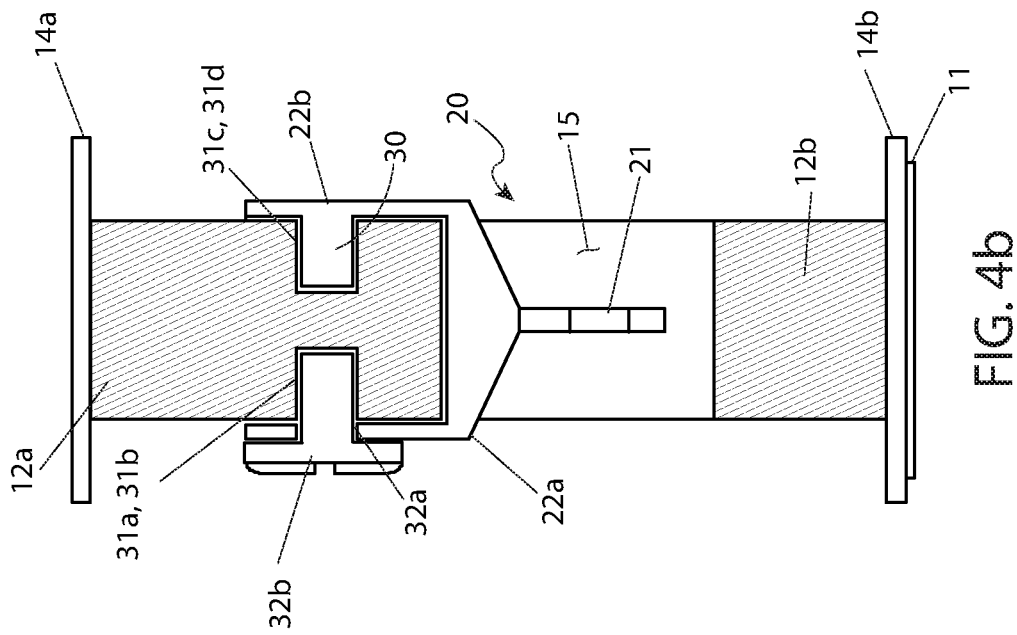
FIG. 4a is a close-up view of an individual positioning assembly 20 of the picture hanging tool 10, according to the preferred embodiment of the present invention; and, FIG. 4b is a cut-away view along the line I-I (see FIG. 1) of the track of the picture hanging tool 10, according to the preferred embodiment of the present invention.
Figure 4A:
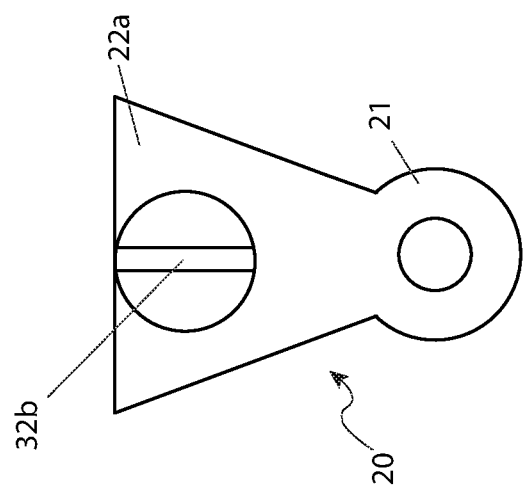

Referring more closely now to FIGS. 4a and 4b, which show a close-up and a cut-away view of the features of an individual positioning assembly 20. Each positioning assembly 20 has a first arm 22a that rides in the first groove 31a or second groove 31b, and a second arm 22b that rides in the third groove 31c and the fourth groove 31d. The first arm 22a and second arm 22b coextensively flare outward at an upper end and taper downward towards a lower common end, which cradles the under surface of the upper portion 12a within the open space 15. Integral with the lower common end is an eyelet 21, which has an upper portion that tapers inward both from the first arm 22a and second arm 22b. The eyelet 21 has a central opening sized to permit the passing of a fastener or marking device, such as a pen or pencil and is oriented such that the open portion can be accessed form either side of the tool 10. The central opening is generally circular in a preferred embodiment, although other shapes can be chosen, and is bordered by a common geometrical perimeter portion that is integral with the upper portion of the eyelet 21. This perimeter portion, and hence the opening portion, of the eyelet 21 is preferably located at a midpoint between the front face and rear face of the tool 10.

An inner facing surface (i.e., the surface facing the rear surface of the upper portion 12a) of the second arm 22b has a protrusion 30 that has a friction fit within the third or fourth grooves 31c, 31d, while still permitting the positioning assembly 20 to travel therein. Located on the first arm 22a is an aperture 32a coaligned with the protrusion 30 on the second arm 22b. This aperture 32a is therefore aligned with the first or second grooves 31a, 31b. A fastener 32b passes through the aperture 32a and is capable of mechanically securing to an inner portion of the first or second grooves 31a, 31b. Thus, when the positioning assembly 20 is manipulated to a desired position relative to the upper portion 12a, where the protrusion 30 of the second arm 22b of the positioning assembly 20 travels within the third or fourth grooves 31c, 31d, the fastener 32b can secure the first arm 22a to the first or second grooves 31a, 31b, thereby fixing the positioning assembly 20 in the said desired position. Such a fastener 32b is envisioned to be a set screw.

It is envisioned that the positioning assemblies 20 are positioned on the tool 10 and secured thereto based on the position of hanging features on works of art, picture frames, or any other similar wall decorations. The tool 10 then is placed on the vertical surface where the wall decoration is intended to be mounted. A marking tool is passed through the opening portion of the eyelets 21 and a mark is placed on the wall, which ostensibly marks the exact position of the hanging features on the wall decoration. The spirit levels 25 and 26 help to ensure a level installation and marking, if so desired. Then the tool 10 is removed from the vertical surface, hanging fasteners are installed, and the hanging features are placed on the hanging fasteners to complete the mounting of the wall decoration on the vertical surface.

The tool 10 can be manufactured out of a rubber or other non-conducting material, suitable for strength, light weight, and resiliency, such as aluminum. It is envisioned that certain embodiments provide for lengths of the tool 10 to be thirty-six inches (36 in.) or seventy-two inches (72 in.). Also, there can be a provision to hold or store the marking device on the tool 10, such as through the mounting aperture 16.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A picture hanging tool comprising:
   a level comprising:
      an upper portion;
      a lower portion;
      a first end portion;
      a second end portion opposite said first end portion;
      a first face; and,
      a second face;
   a first groove aligned within said first face, adjacent said first end and said upper portion;
   a second groove aligned within said first face, adjacent said second end and said upper portion;
   a third groove aligned parallel to said first groove and within said second face, adjacent said first end and said upper portion;
   a fourth groove aligned parallel said second groove and within said second face, adjacent said second end and said upper portion;
   an open space within the interior perimeter of said upper portion, lower portion, first end portion and second end portion and subjacent said first groove, said second groove, said third groove and said fourth groove;
   a first spirit level disposed within the interior perimeter of said upper portion, lower portion, first end portion and second end portion;
   a second spirit level disposed within the interior perimeter of said upper portion, lower portion, first end portion and second end portion;
   a first positioning assembly secured about said first groove and said third groove; and,
   a second positioning assembly secured about said second groove and said fourth groove;
   wherein said first positioning assembly slidingly engages said first groove and said third groove; and,
   wherein said second positioning assembly slidingly engages said second groove and said fourth groove.

2. The tool of claim 1, wherein said first positioning assembly and said second positioning assembly each comprise:
   a first arm configured to slidingly engage said first groove or said second groove;
   a second arm opposite said first arm and configured to slidingly engage said third groove or said fourth groove by means of a protrusion resting within said third groove or said fourth groove; and,
   an eyelet subjacent said first arm and said second arm and projecting into said open space.

3. The tool of claim 2, wherein said first positioning assembly and said second positioning assembly further comprise:

a fastening aperture disposed within said first arm; and,
a fastener.

4. The tool of claim 3, wherein said fastener comprises a threaded screw which when rotated in a first direction secures said first positioning assembly or said second positioning assembly in place; and,
wherein when said threaded screw is rotated in a second direction said first positioning assembly or said second positioning assembly is free to slidingly engage said first groove and third groove or said second groove or said fourth groove.

5. The tool of claim 4, wherein said first spirit level is vertically positioned adjacent said first end portion, subjacent said upper portion and superjacent said lower portion.

6. The tool of claim 5, wherein said second spirit level is horizontally positioned between said first groove and said second groove on said first face and positioned between said third grove and said fourth groove on said second face.

7. The tool of claim 6, further comprising a header perpendicular to and coextensive with said upper portion.

8. The tool of claim 7, further comprising a footer perpendicular to and coextensive with said lower portion.

9. The tool of claim 8, wherein said footer further comprises a magnet disposed upon an outer face of said footer.

10. The tool of claim 1, wherein said first face comprises a plurality of measurement indicia.

11. A picture hanging tool comprising:
a level comprising:
an upper portion;
a lower portion;
a first end portion;
a second end portion opposite said first end portion;
a first face; and,
a second face;
a first groove aligned within said first face, adjacent said first end and said upper portion;
a second groove aligned within said first face, adjacent said second end and said upper portion;
a third groove aligned parallel to said first groove and within said second face, adjacent said first end and said upper portion;
a fourth groove aligned parallel said second groove and within said second face, adjacent said second end and said upper portion;
an open space within the interior perimeter of said upper portion, lower portion, first end portion and second end portion and subjacent said first groove, said second groove, said third groove and said fourth groove;
a first spirit level disposed within the interior perimeter of said upper portion, lower portion, first end portion and second end portion;
a second spirit level disposed within the interior perimeter of said upper portion, lower portion, first end portion and second end portion;

a first positioning assembly secured about said first groove and said third groove;
a second positioning assembly secured about said second groove and said fourth groove; and,
a mounting aperture secured opposite said second spirit level;
wherein said first positioning assembly slidingly engages said first groove and said third groove; and,
wherein said second positioning assembly slidingly engages said second groove and said fourth groove.

12. The tool of claim 11, wherein said first positioning assembly and said second positioning assembly each comprise:
a first arm configured to slidingly engage said first groove or said second groove;
a second arm opposite said first arm and configured to slidingly engage said third groove or said fourth groove by means of a protrusion resting within said third groove or said fourth groove; and,
an eyelet subjacent said first arm and said second arm and projecting into said open space.

13. The tool of claim 12, wherein said first positioning assembly and said second positioning assembly further comprise:
a fastening aperture disposed within said first arm; and,
a fastener.

14. The tool of claim 13, wherein said fastener comprises a threaded screw which when rotated in a first direction secures said first positioning assembly or said second positioning assembly in place; and,
wherein when said threaded screw is rotated in a second direction said first positioning assembly or said second positioning assembly is free to slidingly engage said first groove and third groove or said second groove or said fourth groove.

15. The tool of claim 14, wherein said first spirit level is vertically positioned adjacent said first end portion, subjacent said upper portion and superjacent said lower portion.

16. The tool of claim 15, wherein said second spirit level is horizontally positioned between said first groove and said second groove on said first face and positioned between said third grove and said fourth groove on said second face.

17. The tool of claim 16, further comprising a header perpendicular to and coextensive with said upper portion.

18. The tool of claim 17, further comprising a footer perpendicular to and coextensive with said lower portion.

19. The tool of claim 18, wherein said footer further comprises a magnet disposed upon an outer face of said footer.

20. The tool of claim 11, wherein said first face comprises a plurality of measurement indicia.

* * * * *